W. L. OSTENDORF.
AIR SPRING.
APPLICATION FILED DEC. 21, 1912.

1,108,930.

Patented Sept. 1, 1914.

WITNESSES:
R. F. Dilworth
Loretta Kane

INVENTOR:
Wilhelm L. Ostendorf,
BY Edward A. Lawrence
his ATTORNEY.

W. L. OSTENDORF.
AIR SPRING.
APPLICATION FILED DEC. 21, 1912.

1,108,930.

Patented Sept. 1, 1914.
5 SHEETS—SHEET 4.

WITNESSES:
R. F. Dilworth
Loretta Kane

INVENTOR.
Wilhelm L. Ostendorf,
by Edward A. Lawrence,
his ATTORNEY.

W. L. OSTENDORF.
AIR SPRING.
APPLICATION FILED DEC. 21, 1912.

1,108,930.

Patented Sept. 1, 1914.
5 SHEETS—SHEET 5.

Fig. 13.

WITNESSES:

INVENTOR.
Wilhelm L. Ostendorf,
BY Edward A. Lawrence.
ATTORNEY.

UNITED STATES PATENT OFFICE.

WILHELM L. OSTENDORF, OF WILKINS TOWNSHIP, ALLEGHENY COUNTY, PENNSYL-
VANIA, ASSIGNOR OF ONE-THIRD TO ALBERT H. KLESA AND ONE-THIRD TO
FRANK P. SCOTT, OF ALLEGHENY COUNTY, PENNSYLVANIA.

AIR-SPRING.

1,108,930.        Specification of Letters Patent.      Patented Sept. 1, 1914.

Application filed December 21, 1912. Serial No. 737,936.

*To all whom it may concern:*

Be it known that I, WILHELM L. OSTENDORF, a citizen of the United States, and residing in the township of Wilkins, in the county of Allegheny and State of Pennsylvania, have invented or discovered new and useful Improvements in Air-Springs, of which the following is a specification.

My invention relates to shock-absorbers or cushion-devices intended for use as a substitute for or in combination with the usual resilient metal springs of an automobile or other vehicle.

It more particularly relates to the type of such devices wherein a compressible fluid agent and an incompressible fluid agent are used together, such, for instance, as both air and oil or some other liquid.

Generally speaking, my invention comprises novel means for regulating the internal pressure of the air-spring to properly support and cushion the particular load to be carried. Means are provided for this purpose which are both adjustable and automatic. Means are also provided for throttling or retarding the reciprocation of the telescoping elements of the air-spring against sudden shocks or abnormal reciprocation. Means are also provided for the automatic lubrication of the sliding joints and packing of the device and also the trunnions or other elements whereby the air-spring is mounted on the vehicle.

Other novel and important features of construction and arrangement of parts will appear from the following description.

In the accompanying drawings.

The following is a detailed description of the drawings.

Figure 1:
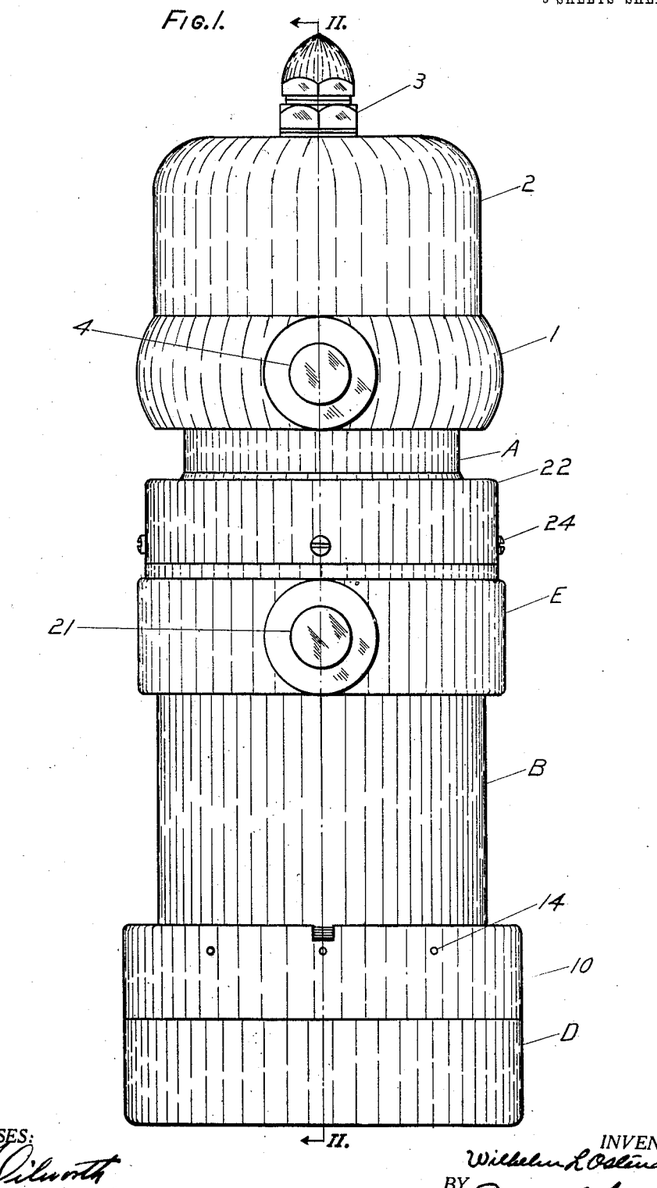
Figure 1 is an elevation of my invention which for convenience I herein term an "air-spring"
Figure 2:
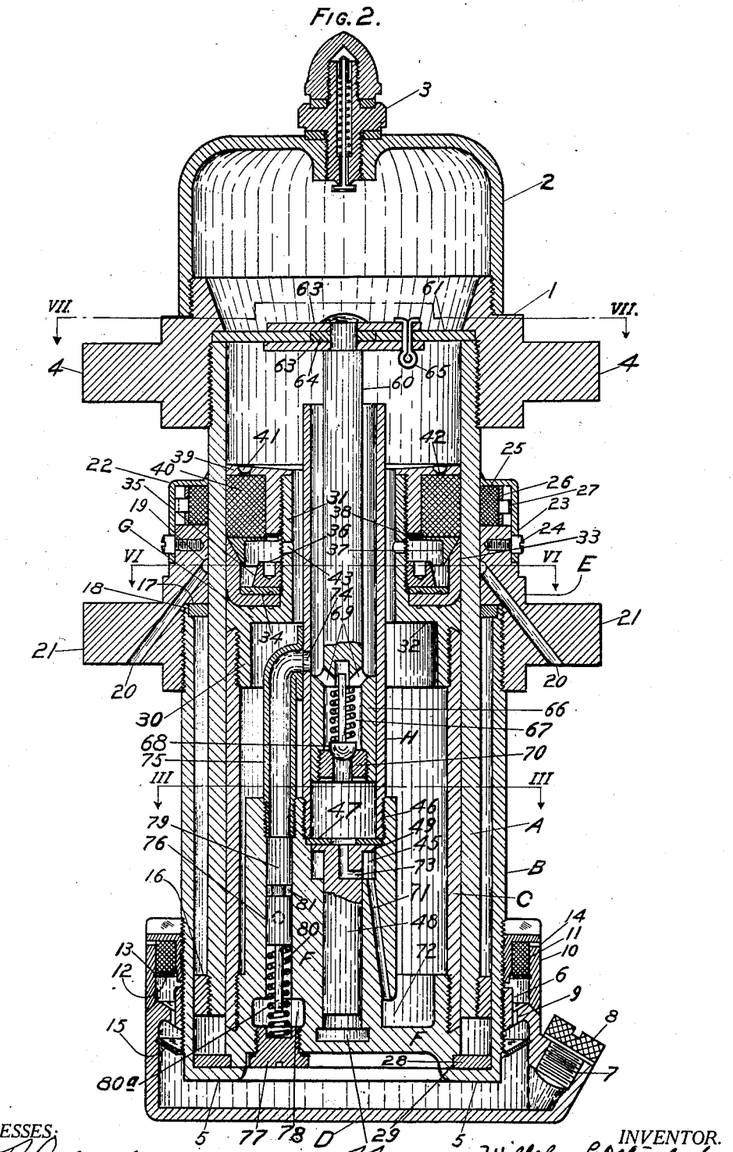
Fig. 2 is a vertical section of the same along the line II—II in Fig. 1.
Figure 3:
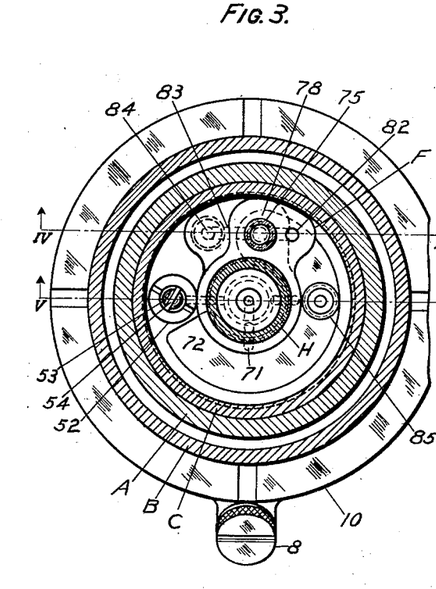
Fig. 3 is a horizontal section, turned 90 degrees clockwise, along the line III—III in Fig. 2.

A is cylinder, shown as depending, reciprocating between an outer or bearing tube B and an inner or piston tube C, between which latter tube and said cylinder is provided a packed sliding joint. The free or upper end of cylinder A is closed by a head which in Figs. 1 and 2 is composed of an annular body or ring member 1 threaded upon the end of cylinder A, and a domed cap 2 threaded on ring 1. The cap 2 is provided with a spring valve 3 through which air and liquid may be introduced into the interior of the air-spring to charge the same and which is preferably closed by a suitable protective cap as shown. As a convenient means for mounting the cylinder 1 upon the frame or other portion of a vehicle, I may provide a pair of oppositely placed trunnions or bearings 4 integral with or mounted upon the ring 1 or cylinder A. The lower or outer end of bearing tube B is exteriorly threaded and provided with an internal annular flange 5.

D is a pan or fluid reservoir, preferably of larger diameter than tube B whose lower end is screwed into the threaded contracted top flange 6 of pan D.

7 is a port in the side of pan D for the introduction of liquid, such as oil, the level of oil being preferably that of the flange 5. 8 is a screw plug adapted to close said port 7.

The flange 6 is provided with a plurality of ports 9 communicating with the interior of the hollow locknut 10 screwed on tube B tightly down against the pan D as shown. In the upper interior of the lock-nut 10 is seated an annular body or packing 11, preferably of fibrous material such as felt.

12 is a split-spring ring seated in the groove 13 in the outer wall of nut 10 and supporting packing 11 in its place. The inner perimeter of said ring is spaced away from the inner wall of nut 10 so as to leave an annular air-passage. The outer wall of nut 10 is provided with a plurality of small ports 14 whose inner ends impinge upon the felt packing 11.

15 is a downwardly and inwardly inclined annular baffle extending from the vertical wall of pan D toward the tube B but not contacting with the latter, thus leaving an annular air passage. It is evident from the foregoing that a "breather" is provided for the pan D which will maintain the pressure therein at substantially that of atmosphere while preventing the escape of oil or liquid. The baffle 15 will prevent the oil splashing up into the nut 10 and any oil in said nut will flow down the inclined baffle into the pan D.

The upper or open end of bearing tube B is threaded into a bearing ring E which has a sliding fit with the cylinder A. A stop ring 16 is threaded on the inner end of cylinder A to prevent said cylinder being drawn out of said bearing ring by an abnormal expansion of the air-spring. A cushion ring 17, preferably of compressible material, is secured in the end of tube B against the ring E to receive the impact of ring 16. A seat 18 in the inner wall of tube B supports ring 17 in place.

The bore of bearing E is provided with a circumferential groove 19 which encircles the cylinder A and collects excess lubricant. Said collected lubricant is led through passages 20 downwardly inclined through the material of ring E to the bearing surfaces of trunnions 21 integral with or mounted upon the ring E as a convenient means for mounting the bearing tube on the vehicle.

22 is an annular scraper snugly encircling the cylinder A and having a depending flange 23 which is secured to the top of bearing ring E as by screws 24.

25 is an annular washer or packing, preferably of felt, within scraper 22 and held in closed contact with cylinder A by means of an encircling split-spring ring 26 provided with outwardly extending spring fingers 27 which bear against the inner wall of scraper 22, thus resiliently compressing the packing 25 against the wall of the cylinder. It is evident that said scraper will remove the dust, dirt or mud collecting on the exposed wall of cylinder A and together with its packing 25 prevent such foreign material entering between said cylinder and the bearing ring E.

The piston tube C has a sliding fit in cylinder A and its lower end is closed by screwing therein a head F. The head F seats upon the flange 5 of tube B and is kept from rising therefrom by the internal pressure of the air-spring.

28 is a compressible packing ring or spacer interposed between the head F and the tube B to maintain said tube laterally in its proper relation to said tube B but the compressibility of said ring 28 enables the head F and the piston tube C to move sufficiently to accommodate itself to such lateral or torsional thrust and strains which may be exerted either upon the cylinder A or the bearing tube B without danger of injury to the packed sliding joint or the other elements of the air-spring. The ring 28 also serves as a buffer for the stop ring 16 in case of abnormal movement of the cylinder A. The ring 28 may be maintained in place by means of an annular seat or recess 29 in the head F.

The details of construction of head F are hereinafter described in full.

G is a ring member screwed by means of its annular flange 30 into the upper end of the piston tube C. Said member G is composed of the depending flange 30, the upwardly extending flange 31 of less diameter and externally threaded, and a horizontal intermediate web 32 whose edge has a sliding fit with the cylinder A and which forms a seat for the leather packing cup 33, the outer edge of said seat being curved upwardly as shown to support the angle of said cup 33. The cup 33 is locked in place by means of a washer 34 and a nut 35 screwed down on annular flange 31 of member G.

36 represent spanner holes in nut 35.

37 is an annular cone expander whose beveled edge bears against the reversely beveled top edge of cup 33 and forces the same into snug contact with the wall of cylinder A.

38 are upwardly extending spring-fingers partially cut from the top of expander 37 and compressed by the lower edge of the nut 39 screwed on the flange 31 of member G. A resilient outward pressure is thus exerted on the cup 33 which tightly and effectually packs the joint between the cylinder A and the piston tube C. The nut 39 is of substantially inverted L-shape cross-section with an inwardly inclined top surface, as shown.

40 is an annular body of fibrous material or lubricator mounted as shown in the angle of nut 39 and resting upon the top of expander 37, said packing or lubricator being in light contact with the wall of cylinder A. The top surface of nut 39 is provided with a concentric annular groove or channel 41 from which vertical ports 42 lead at intervals to the lubricator 40.

Means, hereinafter described in full, deposit oil or other lubricating liquid upon the top surface of nut 39 which fills groove 41 and descends down through ports 42 to saturate the lubricator 40 which thus is enabled to properly lubricate the wall of cylinder A. The surplus liquid flows inwardly off of the top of nut 39 down into the interior of the air-spring. A portion of the lubricant applied to cylinder A works down between said cylinder and the piston tube, lubricating stop ring 16 and working up between the bearing tube B and cylinder A to lubricate the bearing ring E and collecting in groove 19 thence passing to the trunnions 21. Lubricant also seeps or flows from the lubricator 40 down between the spring fingers 38 of expander 37 into the annular space between the cup 33 and the flange 31 of the member G thus maintaining in contact with said cup a sufficient body of liquid to thoroughly lubricate the leather or other material of said cup. The surplus lubricant escapes from said annular space through the horizontal ports 43 into the bore of member G and then to the bottom of the air-spring.

The head F contains a low-pressure pump which raises liquid or liquid and air from the pan D to the interior proper of the air-spring, and said head also supports the tube or cylinder of a high-pressure pump whose plunger is mounted on the cylinder A. The high-pressure pump raises liquid from the bottom of the air-spring proper to supply the lubricator 40 and it also serves to throttle the reciprocation of the cylinder A and the tubes B and C, as is hereinafter described.

The head F is provided with a central vertical bore 44 enlarged circumferentially and closed at the bottom. The upper end of the bore 44 communicates at its top with an enlarged bore 45 which in turn communicates at its top with a still larger bore 46 which is threaded. Screwed into the bore 46 is the lower end of high-pressure pumptube H, the lower end of said tube holding in place a perforated plate 47 which separates bores 45 and 46.

48 is a plunger adapted to reciprocate in the bore 44 and having an enlarged or flanged head 49 which reciprocates in the bore 45, its upward movement being limited by the plate 47.

A vertical bore 50 extends through the head F, its lower portion being contracted to form a seat for the upwardly opening ball-valve 51. The upper portion of bore 50 is countersunk and threaded to accommodate the seat 52 of the upwardly opening ball-valve 53 held against displacement by a cross-pin 54. A lateral passage 55 leads from the bore 50 intermediate of the ball-valves into the bottom of the bore 44. It is evident that when plunger 48 rises, through the influence of the high-pressure pump as will be described, the lower ball-valve 51 is opened and lubricant and air drawn from the pan D into the bottom of the bore 44. During the descent of plunger 48 the ball-valve 51 is closed and ball-valve 53 opened, permitting the fluid drawn, as above described from pan D to be forced up into the interior of the air-spring. To prevent the pumping of liquid exclusively from pan D and to enable the said low-pressure pump to draw sufficient air from said pan into the interior of the air-spring to compensate for any leakage to atmosphere as between the tubes B and C and the cylinder A, I provide the lower end of the bore 50 with an intake body or mixer 56 having a vertical bore 57, a low level liquid passage 58 and an air passage 59 whose intake is above the normal level of liquid in pan D but whose outlet into bore 57 is at the level of passage 58. It is evident that a quantity of liquid would normally stand in the bottom of bore 57 which would ascend said bore first into the bore 50 to be followed by mixed liquid and air. I prefer to make the air-passage 9 of somewhat greater capacity than liquid passage 58 to facilitate the intake of the mingled fluids.

Figure 7:
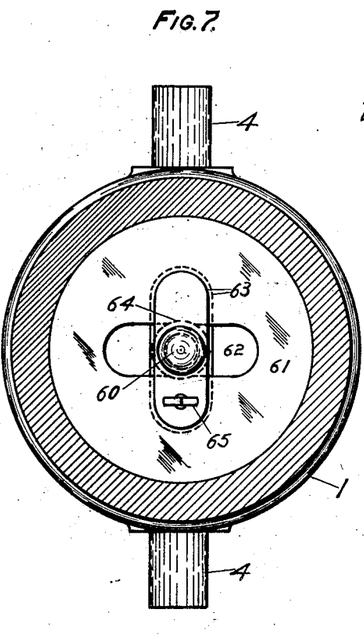
Fig. 7 is a similar view along the line VII—VII in Fig. 2.
Figure 8:
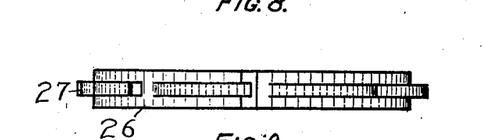
Fig. 8 is an elevation of the split-spring ring used to hold the packing of the scraper snugly in contact with the cylinder.
Figure 9:
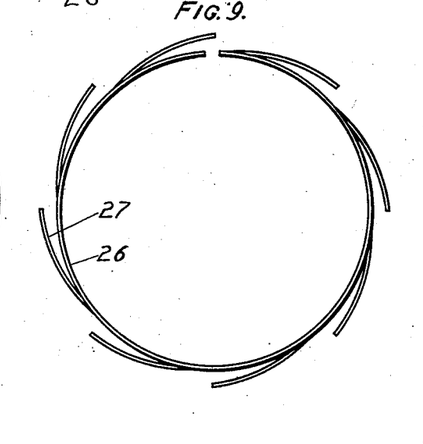
Fig. 9 is a plan view of the same.
Figure 10:
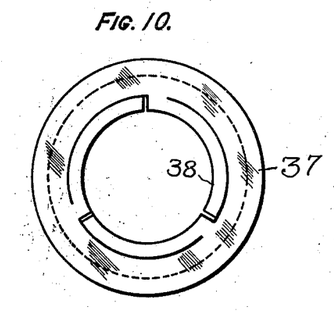
Fig. 10 is a plan view of the expander ring used in connection with the packing cups.
Figure 11:
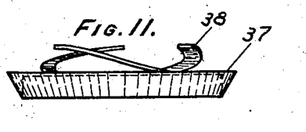
Fig. 11 is a side elevation of the same.

The high-pressure pump mechanism is as follows. 60 is a plunger rod mounted in any convenient manner to reciprocate with cylinder A and fitting loosely in the tube H. As a convenient method of mounting the rod 60, I have shown in Figs. 2 and 7 a metal diaphragm or plate 61 held between the top of cylinder A and an internal lip on ring member 1. Plate 61 is provided with a diametric slotted opening 62. The rod 60 is provided with a pair of adjacent cross-heads 63 separated for the thickness of the plate 61 by a small washer 64. The upper cross-head is of proper size to pass through the slot 62 when turned in the proper direction. In assembling, the cross-heads are turned to register with said slot and the upper cross-head is inserted through the latter. The cross-heads are now turned at right angles to said slot, having between them a portion of the plate 61. A cotter pin, or pins, 65 is now inserted through registering holes in said cross-heads and said plate to hold the plunger rod securely in its mounting. The lower end of rod 60 is enlarged to form a head 66 having a sliding fit in the tube H. Said head is provided with an axial bore 67 normally closed by upwardly opening spring-actuated valve 68.

69 are inclined radial ports leading from the upper end of bore 67 into the interior of tube H above said head. As a convenient means of rendering the tension of the valve spring adjustable, so that the valve may be made to open at varying pressures, I prefer to form the seat thereof by screwing the nipple 70 in the bore 67, the adjustment of said nipple regulating the strength of the valve-spring.

71 is a passage in head F connecting the bottom of bore 45 with an open channel 72 in said head, the upper end of said passage 71 being closed by the flanged top of plunger 48 when said plunger is depressed. 73 is an L-shape passage in the top of plunger 48 adapted to connect the passage 71 with the bore 46 and the interior of tube H when said plunger is raised, as shown in Fig. 2, thus admitting liquid into said tube. Thus during the ascent of the head 66 in the tube H liquid is drawn into the tube H to the full capacity of passage 71. The descent of head 66 in the tube H, in unison with the descent of cylinder A, forces plunger 48 to descend sealing the end of passage 73 and preventing the escape of liquid therethrough from the tube H into the passage 71 and thence to the bottom of tube C.

The function of the rise and fall of plunger 48 in the operation of the low pressure pump has already been described, and it is thus evident that the low-pressure pump is operated by the high-pressure pump.

The increasing pressure in the lower portion of tube H as the head 66 descends therein eventually overcomes the resistance of the spring of valve 68, opening the same and permitting liquid to pass through bore 67 and ports 69 into the tube H above the head 66 to be carried up by the reciprocation of the head 66 to overflow the top of tube H. As previously explained, a portion of said overflow is deposited upon the top of nut 39 to supply the lubricator 40 and lubricate the cup leather, the remainder of said overflow escaping down between the member G and the tube H, sufficient space between the same being provided for that purpose.

It is evident that the high-pressure pump, in addition to its functions of operating the low-pressure pump and lubricating the sliding joints, also throttles or retards the reciprocation of the elements of the air-spring for the reason that the relatively small capacity of passage 71 compared to the capacity of tube H causes a deficiency in said tube of liquid beneath the head 66, and the low pressure beneath said head retards or throttles its ascent and likewise throttles the ascent of the cylinder A. By regulating the capacity of said passage 71 in relation to that of the tube H I may vary the retarding effect to suit various conditions. The downstroke of cylinder A is retarded or throttled owing to the fact that the tension of the spring of valve 68 must be overcome before the liquid in the lower portion of tube H may escape up past the head 66. By adjusting the tension of said valve-spring, it may be arranged to open at any desired pressure, thus regulating said throttling action. The throttling function of the high-pressure pump is very important in counteracting sudden shocks and abnormal tendencies toward expansion or contraction of the air-spring. The air-spring is thus rendered less sensitive and responsive.

Another function in which the high-pressure pump participates is the automatic relief of excessive pressure in the interior of the air-spring. Such excessive pressure would impair the efficiency of the air-spring and eventually render it inoperative. The following is a description of this feature of my invention: 74 is a port in the tube H below the normal limit of upstroke of head 66, and 75 is a tube connecting said port with a vertical bore in the head F whose lower end is closed by a screw-plug 77. The lower end of bore 76 is intersected by a horizontal passage 78 in head F which is a continuation of the channel 72. 79 is a piston valve sliding in bore 76 and normally held up against the bottom of tube 75 by the coiled spring 80. A depending valve stem 80ª guides the spring 80 and limits the downward movement of the valve 79 by contacting with the plug 77. Valve 79 is provided with the circumferential groove 81 which, when said valve is depressed to its lowermost position establishes communication between two passages 82 and 83 formed in the head F.

Figure 4:
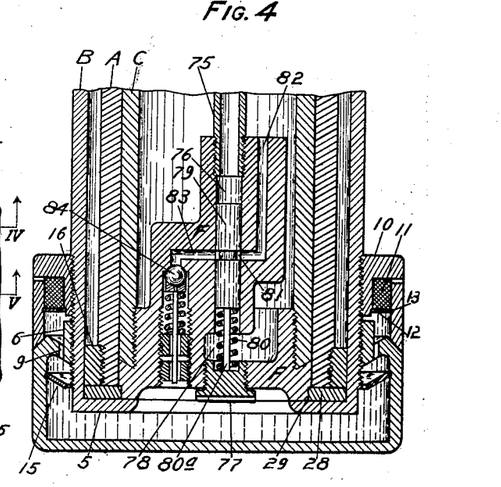
Fig. 4 is a vertical section along the line IV—IV in Fig. 3 and showing the piston valve connecting the relief passages.
Figure 5:
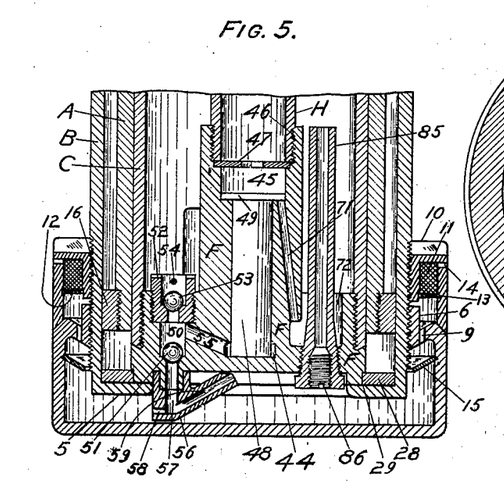
Fig. 5 is a similar section along the line V—V in Fig. 3.
Figure 6:
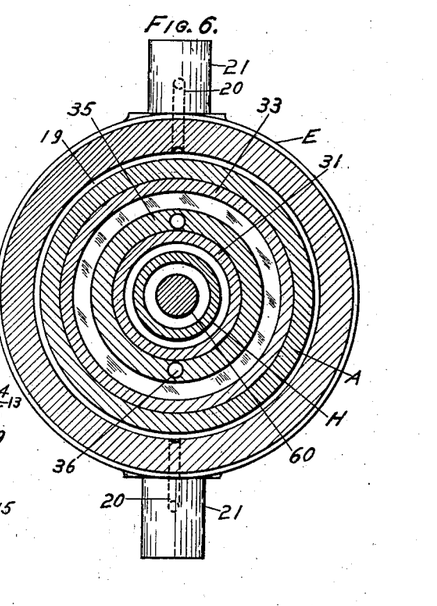
Fig. 6 is a horizontal section along the line VI—VI in Fig. 2.

The passage 82, Fig. 4, is L-shape and leads from the top of head F to said bore 76 while the passage 83 is also L-shape and leads from said bore 76, opposite to the end of passage 82, into the pan D. The location and direction of these passages may be varied but I find the above described arrangement satisfactory. The lower or outer end of passage 83 is countersunk for the installation of an adjustable spring-actuated valve 84 opening toward pan D. The valve 84 is adjustable to open at any desired pressure in passage 83.

While the head 66 is descending in tube H above the port 74, the pressure in tube H, entering the tube 75 and bore 76, depresses piston-valve 79 until it establishes communication between passages 82 and 83 thus admitting air-spring pressure into passage 83 against spring-closed valve 84. In case such pressure is sufficient to open said valve against its spring, said excess of pressure will be exhausted through passages 82 and 83 into the pan D whence it will be dissipated to atmosphere through the "breather" already described. In case oil or other liquid has accumulated above the level of the intake of passage 82, said excess oil will likewise be relieved into pan D. Immediately upon the escape of such excess pressure of air or liquid or both from the interior of the air-spring through said valve 84, said valve will automatically close and prevent further escape. Unless the pressure in the air-spring is greater than that at which the valve 84 is set to open, said valve will remain closed. Therefore the adjustment of valve 84 controls the air-spring pressure and by means of such adjustment the air-spring may be accurately set at any pressure which may be required to properly support and cushion any particular load. As soon as the head 66 passes the port 74, the actuating pressure is relieved in bore 76 and the piston-valve 79 rises and shuts off communication between passages 82 and 83. The admission of air-spring pressure through passage 78 under the piston-valve 79 balances the fluid pressure against both ends of said piston-valve and permits it to respond readily. It is evident that the spring of piston-valve 79 should be of less strength than that of valve 68 since the former valve must be depressed by pressure insufficient to open the latter.

85 is a gage-pipe whose lower end is supported by being screwed into a threaded hole in head F and whose upper end is preferably at a level with the upper end of passage 82. The lower end of gage-pipe 85 is usually closed by a screw plug 86.

The air-spring is charged for service as follows: The pan D is removed and the plug 86 unscrewed from the lower end of gage pipe 85. Liquid, such as for instance, oil, is introduced into tube C through the top valve 3 until it overflows the top of gage pipe 85. When the excess liquid has escaped the plug 86 is screwed home in pipe 85. The automatic relief valve, 84 is now adjusted to open when the pressure admitted to it through passages 82 and 83 rises above the point desired in the air-spring. The pan D is now screwed on and filled to the proper level. Air is now introduced through the top valve 3 until the pressure in the air-spring substantially equals that determined by the adjustment of the relief valve 84. The spring is now ready for use.

In operation the low pressure pump will raise oil and air from the pan D to the interior of the air-spring and the high pressure pump will raise oil from the bottom of tube C to the lubricator 40, permitting the excess to drop down again into the bottom of tube C. The high pressure pump will retard and cushion the reciprocation of the telescopic elements and any undue rise in air pressure or of oil in the air-spring will be automatically relieved into pan D, whence the excess air pressure will escape through the breather to atmosphere.

Figure 12:
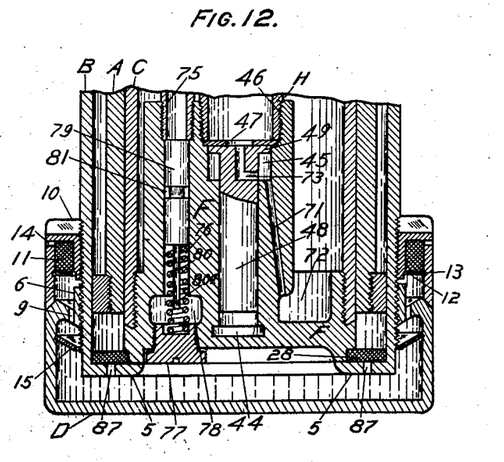
Fig. 12 is a view similar to Fig. 5 showing a modification.

In Fig. 12 I show a slight modification, providing vertical ports 87 through the flange 5 of the bearing tube B under the compressible packing 28. By this means any excess of oil gathering in the bottom of tube B outside of tube C may be allowed to seep down into pan D and excess air pressure in pan D may be relieved through the ports 87 and up between cylinder A and tube B to atmosphere. The ring 28 is in this case preferably of fiber thus forming a filter for the oil descending through ports 87 to cleanse the same from dirt and grit.

Figure 13:
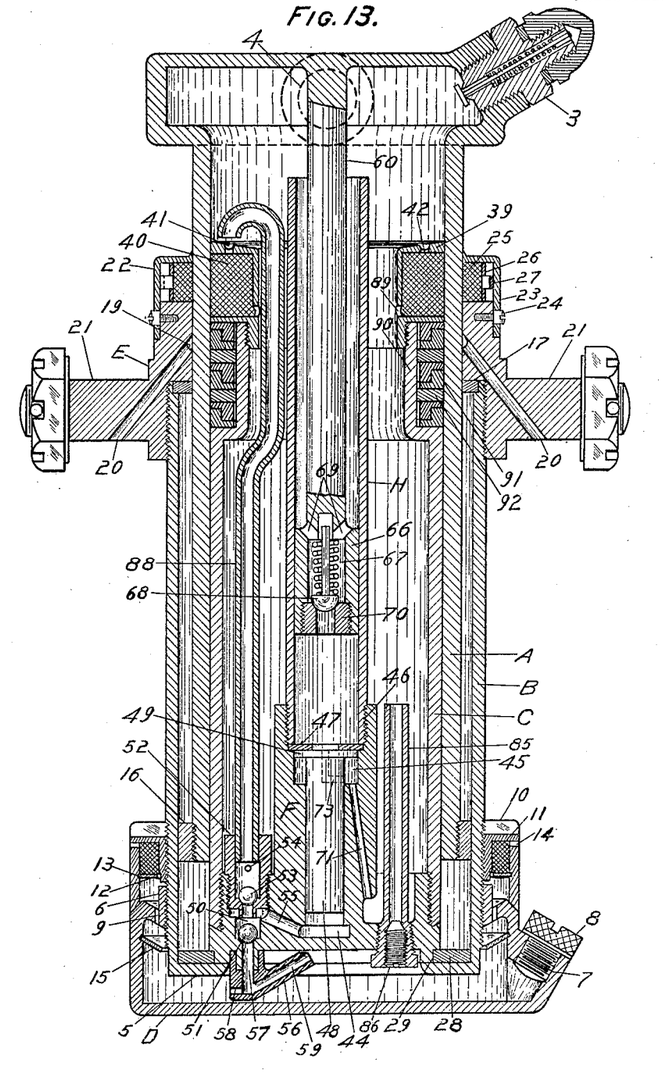
Fig. 13 is a view similar to Fig. 2 showing a modification.

In Fig. 13 I show a modification wherein the low pressure pump accomplishes the function of supplying oil to the lubricator 40, discharging said oil through a vertical connecting tube 88 into the upper face of the nut 39, the excess oil escaping through ports 89 in said nut into the interior of the air-spring. In this modification I have done away with the ring member G and substituted therefor an annular offset 90 on the upper end of the piston tube C upon which are mounted the split-spring packing rings 91 spaced apart by spacers 92 and clamped in position by the lower horizontal flange of the nut 39, which in this case encompasses the lubricator 40 on three sides and which screws into the threaded end of the tube C as shown.

In Figs. 1 and 2 I have shown a domed cap 2 closing the upper end of cylinder A and I prefer this type as providing additional air pressure capacity, but I may substitute any other character of closure, such, for instance that shown in Fig. 13 wherein the top of said cylinder is flat and the rod 60 is attached directly thereto. This type is convenient where economy in space is necessary and the valve 3 may be placed at one side instead of on top. Here I have indicated in dotted lines the trunnions 4 shifted longitudinally 90° giving additional elasticity to the air-spring mounting.

Although, for the sake of clearness, I have minutely described the embodiment of my invention shown in the drawings, I do not wish to limit myself thereby but claim broadly:—

1. In an air-spring, telescoping cylinders forming a cushion chamber and containing fluid, a pump actuated by the reciprocation of said cylinders adapted to raise said fluid in said chamber, and a valve actuated by the reciprocation of said cylinders controlling the admission of liquid to said pump, the capacity of said valve being less than that of said pump whereby the reciprocation of said cylinders is throttled.

2. In an air-spring, telescoping cylinders forming a cushion chamber and containing fluid, a pump adapted to raise said fluid in said chamber and consisting of a pump barrel mounted in unison with one of said cylinders and a plunger mounted in unison with the other cylinder and reciprocating in said barrel, and a resiliently seated valve in said plunger whereby the reciprocation of said cylinders is throttled.

3. In an air-spring, telescoping cylinders forming a cushion chamber and containing fluid, a pump adapted to raise said fluid in said chamber and consisting of a pump barrel mounted in unison with one of said cylinders and a plunger mounted in unison with the other cylinder, and a valve in said plunger of less capacity than said barrel whereby the reciprocation of said cylinders is throttled.

4. In an air-spring, telescoping cylinders forming a cushion chamber and containing fluid, a low pressure reservoir communicating with said chamber by means of a passage, means whereby said passage is blocked but when the pressure in said chamber rises above a predetermined degree said passage opens and permits the excess fluid to escape into said reservoir, and a pump actuated by the reciprocation of said cylinders adapted to transfer fluid from said reservoir to said chamber.

5. In an air-spring, telescoping cylinders forming a cushion chamber and containing fluid, a low pressure reservoir communicating with said chamber by means of a passage, a relief valve in said passage whereby excess pressure in said chamber may be relieved into said reservoir, and means operated by the reciprocation of said cylinders for admitting chamber pressure during the expansion of said telescoping cylinders through said passage to said relief valve.

6. In an air-spring, telescoping cylinders forming a cushion chamber and containing fluid, a reservoir communicating with said chamber by means of a passage, a relief valve in said passage whereby excess pressure in said chamber may be relieved into said reservoir, and a piston valve intersecting said passage and actuated by the reciprocation of said cylinders whereby said passage is alternately opened and closed.

7. In an air-spring, telescoping cylinders forming a cushion chamber and containing fluid, a pump actuated by the reciprocation of said cylinders, a reservoir communicating with said chamber by means of a passage, a relief valve in said passage, and means controlled by said pump for admitting chamber pressure at intervals through said passage to said relief valve.

8. In an air-spring, telescoping cylinders forming a cushion chamber and containing fluid, a pump barrel mounted on one of said cylinders, a pump plunger mounted on the other cylinder and reciprocating in said barrel, a reservoir communicating with said chamber by means of a passage, a relief valve in said passage whereby excess pressure in said chamber may be relieved into said reservoir, a piston valve intersecting said passage and adapted to close the same, and means whereby the movement of said plunger in said barrel actuates said piston valve and opens said passage at intervals to admit chamber pressure to said relief valve.

9. In an air-spring, telescoping cylinders forming a cushion chamber and containing fluid, a low pressure reservoir communicating with said chamber by means of a passage, an automatic relief valve in said passage whereby excess fluid in said chamber is relieved into said reservoir, automatic means for maintaining a lower pressure in said reservoir than in said chamber, and a pump actuated by the reciprocation of said cylinders for transferring fluid from said reservoir to said chamber.

10. In an air-spring, telescoping cylinders forming a cushion chamber and containing fluid, a low pressure reservoir communicating with said chamber by means of a passage, an adjustable automatic relief valve in said passage whereby excess fluid in said chamber is relieved into said reservoir, automatic means for maintaining a lower pressure in said reservoir than in said chamber, and a pump actuated by the reciprocation of said cylinders for transferring fluid from said reservoir to said chamber.

11. In an air-spring, telescoping cylinders forming a cushion chamber, a reservoir, means for relieving excess fluid from said chamber to said reservoir, and a breather connecting said reservoir to atmosphere.

12. In an air-spring, telescoping cylinders forming a cushion chamber, a reservoir, means for supplying fluid from said reservoir to said chamber, means for relieving excess fluid from said chamber to said reservoir, and a breather connecting said reservoir to atmosphere.

13. In an air-spring, telescoping cylinders forming a cushion chamber, a reservoir containing a liquid and a gaseous fluid, means for feeding said fluids from said reservoir to said chamber, and fluid mixing means associated with said feeding means.

14. In an air-spring, telescoping cylinders forming a compression chamber, a reservoir containing a liquid and a gaseous fluid, a pump feeding fluid into said chamber, and means whereby said pump injects both of said fluids into said chamber.

15. In an air-spring, telescoping cylinders forming a compression chamber, a reservoir containing a liquid and a gaseous fluid, a pump feeding fluid to said chamber, and a combined liquid and gaseous intake for said pump.

16. In an air-spring, telescoping cylinders forming a cushion chamber and containing liquid, a packed sliding joint for said cylinders, a lubricator mounted on one of said cylinders and contacting with the wall of the other cylinder, and a pump operated by the reciprocation of said cylinders raising said liquid in said chamber and discharging the same upon said lubricator.

17. In an air-spring, telescoping cylinders forming a cushion chamber and containing liquid, a packed sliding joint for said cylinders, a lubricator mounted on one of said cylinders and contacting with the wall of the other cylinder, a feeding device superimposed on said lubricator, and a pump operated by the reciprocation of said cylinders raising said liquid and discharging the same upon said feeding device.

18. In an air-spring, telescoping cylinders forming a cushion chamber and containing liquid, a packed sliding joint for said cylinders, a lubricator mounted on one of said cylinders and contacting with the wall of the other cylinder, a feeder adapted to contain liquid superimposed on said lubricator and having ports communicating with the latter, and a pump operated by the reciprocation of said cylinders raising said liquid and discharging the same upon said feeder.

19. In an air-spring, telescoping cylinders forming a cushion chamber containing fluid, a packed sliding joint between said cylinders, a pump tube mounted on one of said cylinders and having an intake in the bottom of said chamber, a diaphragm mounted in the other cylinder, and a pump plunger mounted on said diaphragm and reciprocating in said tube.

20. In an air-spring, telescoping cylinders forming a cushion chamber containing fluid, a packed sliding joint between said cylinders, a pump tube mounted on one of said cylinders and having an intake in the bottom of said chamber, a diaphragm mounted in the other cylinder, a pump plunger reciprocating in said tube, and cross-heads on said plunger embracing between them said diaphragm.

21. In an air-spring, telescoping cylinders forming a cushion chamber containing fluid, a packed sliding joint between said cylinders, a pump tube mounted on one of said cylinders and having an intake in the bottom of said chamber, a diaphragm mounted in the other cylinder and provided with a diametric slot, a plunger rod reciprocating in said tube and provided with a pair of cross-heads, one of said cross-heads being adapted to be passed through said slot and to be turned out of registration therewith whereby said diaphragm is embraced between said cross-heads, and means for holding said cross-heads against displacement.

22. In an air-spring, the combination of a bearing tube, a cylinder telescoping in said bearing tube, and a piston tube mounted in said bearing tube and telescoping in said cylinder, said piston tube being loosely mounted in said bearing tube and capable of movement in relation thereto, and a packed sliding joint between said cylinder and said piston tube.

23. In an air-spring, the combination of a bearing tube, a piston tube mounted in said bearing tube but unattached thereto so as to be capable of movement in relation to said bearing tube, a cylinder telescoping between said tubes, and a packed sliding joint between said cylinder and said piston tube.

24. In an air-spring, the combination of a bearing tube, a piston tube mounted in said bearing tube but unattached thereto so as to be capable of movement in relation to said bearing tube, a compressible spacer between said tubes, and a cylinder telescoping between said tubes, and a packed sliding joint between said cylinder and said piston tube.

25. In an air-spring, a bearing tube, a cylinder telescoping in said bearing tube, a piston tube supported in said bearing tube and telescoping in said cylinder, means for lubricating the contacting walls of said tubes and said cylinder, and trunnions on said bearing tube provided with passages communicating with the interior of said bearing tube whereby lubricant is supplied to said trunnions.

26. In an air-spring, a bearing tube, a cylinder telescoping therein, a piston tube supported in said bearing tube and having a packed sliding joint with said cylinder, and a reservoir beneath said bearing tube communicating with the same for the downward passage of liquid from said bearing tube into said reservoir.

27. In an air-spring, a bearing tube, a cylinder telescoping therein, a piston tube supported in said bearing tube and having a packed sliding joint with said cylinder, a reservoir beneath said bearing tube and a filter interposed between said bearing tube and said reservoir whereby liquid escaping from said bearing tube into said reservoir is cleansed of impurities.

28. In an air-spring, a bearing tube having a closed lower end, a depending cylinder telescoping therein, a piston tube seated in said bearing tube and telescoping in said cylinder, a packed sliding joint between said cylinder and said piston tube, means for supplying a lubricant to said joint, and a filter in the lower portion of said bearing tube whereby excess liquid escaping into the bottom of said bearing tube is cleansed in its passage.

29. In an air-spring, telescoping cylinders having a packed sliding joint and forming a compression chamber, a high pressure pump adapted to raise a liquid within said chamber, a reservoir, and a low pressure pump adapted to raise a liquid from said reservoir and discharge the same to lubricate said packed joint.

30. In an air-spring, telescoping cylinders forming a cushion chamber and containing fluid, a pump actuated by the reciprocation of said cylinders, a reservoir communicating with said chamber by means of a passage, a relief valve in said passage, a second pump adapted to transfer fluid from said reservoir to said chamber, and means controlled by said first pump for admitting chamber pressure at intervals through said passage to said relief valve.

31. In an air-spring, telescoping cylinders forming a cushion chamber and containing fluid, said chamber being provided with an escape passage, a relief valve in said passage whereby excess pressure may be relieved from said chamber, and a piston valve intersecting said passage and actuated by the reciprocation of said cylinders whereby said passage is alternately opened and closed.

32. In an air-spring, telescoping cylinders forming a cushion chamber and containing fluid, a pump barrel mounted on one of said cylinders, a pump plunger mounted on the other cylinder and reciprocating in said barrel, a passage leading from said cushion chamber, a pressure relief valve in said passage whereby excess pressure may be relieved from said chamber, a piston valve intersecting said passage and adapted to close the same, and means whereby the movement of said plunger in said barrel actuates said piston valve and opens said passage at intervals to admit chamber pressure to said relief valve.

33. In an air-spring, telescoping cylinders forming a cushion chamber and containing fluid and having a passage leading therefrom for the escape of excess pressure, an automatic relief valve in said passage, a pump operated by the reciprocation of said cylinders, and means controlled by pump pressure for intermittently admitting chamber pressure through said passage to said valve.

34. In an air-spring, telescoping cylinders forming a cushion chamber and containing fluid, a pump actuated by the reciprocation of said cylinders, a second pump supplying fluid to said chamber and actuated by said first pump, and a valve controlling the admission of fluid into said first pump from said chamber.

35. In an air-spring, telescoping cylinders forming a cushion chamber and containing fluid, a pump actuated by the reciprocation of said cylinders, a second pump actuated by said first pump for supplying fluid to said chamber, and a valve intermediate of said pumps controlling the introduction of fluid from said chamber to said first pump.

36. In an air-spring, telescoping cylinders forming a cushion chamber and containing fluid, a fluid reservoir, a pump actuated by the reciprocation of said cylinders adapted to raise the fluid within said chamber, a second pump actuated by said first pump adapted to supply fluid from said reservoir to said chamber, and a valve intermediate of said pump controlling the admission of fluid into said first pump from said chamber.

37. In an air-spring, telescoping cylinders forming a cushion chamber and containing fluid, a fluid reservoir beneath said chamber, a pump actuated by the reciprocation of said cylinders adapted to raise fluid within said chamber, a second pump actuated by said first pump adapted to raise fluid from said reservoir to said chamber, and a valve intermediate of said pumps controlling the admission of fluid from said chamber into said first pump.

38. In an air-spring, telescoping cylinders forming a cushion chamber and containing a fluid, a low pressure reservoir beneath said chamber, means for filling said reservoir, a pump actuated by the reciprocation of said cylinders adapted to raise fluid within said chamber, a second pump actuated by said first pump for supply fluid from said reservoir to said chamber, and a valve intermediate of said pumps controlling the admission of fluid from said chamber into said first pump.

39. In an air-spring, telescoping cylinders forming a cushion chamber and having a packed sliding joint, said chamber containing fluid, a fluid reservoir, a pump actuated by the reciprocation of said cylinders adapted to raise fluid in said chamber, and a second pump actuated by said first pump and adapted to supply fluid from said reservoir to said chamber.

Signed at Pittsburgh, Penna., this 17th day of December, 1912.

WILHELM L. OSTENDORF.

Witnesses:
E. A. LAWRENCE,
J. H. HARRISON.